Figure 1:
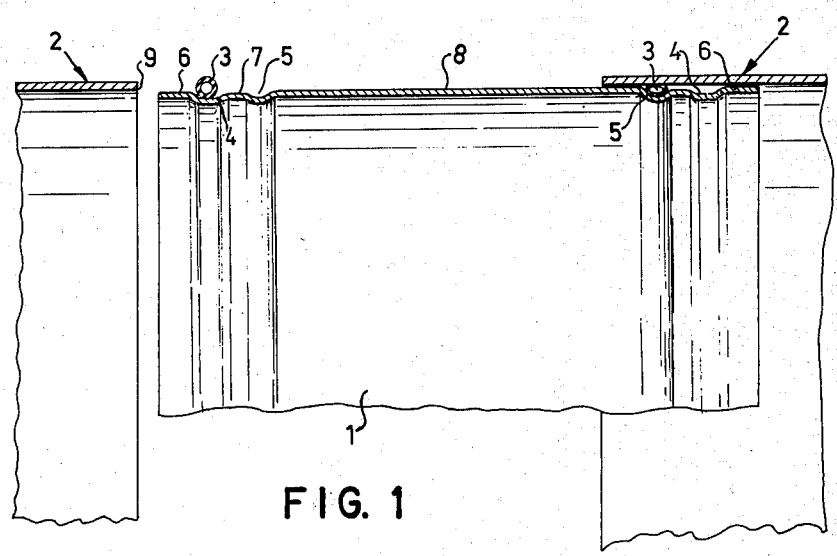

United States Patent [19]

Fridman et al.

[11] 3,993,334

[45] Nov. 23, 1976

[54] PIPE JOINTING PIECE WITH O-RINGS

[75] Inventors: Rune Evert Fridman, Jonkoping; Hans Gösta Johansson, Bankeryd, both of Sweden

[73] Assignee: Stifab AB, Jonkoping, Sweden

[22] Filed: Sept. 8, 1975

[21] Appl. No.: 611,332

[30] Foreign Application Priority Data

Sept. 23, 1974 Sweden .............................. 7411933

[52] U.S. Cl. ................................ 285/344; 285/370; 285/424
[51] Int. Cl.² ......................................... F16L 17/00
[58] Field of Search .......... 285/344, 230, 345, 231, 285/370, 233, 424; 277/207 A

[56] References Cited

UNITED STATES PATENTS 3,494,639  2/1970  Smith .............................. 285/344 X

FOREIGN PATENTS OR APPLICATIONS 1,096,471  2/1955  France ............................... 285/344
865,885    2/1953  Germany ............................ 285/344
972,126   10/1964  United Kingdom ................. 285/370

Primary Examiner—Dave W. Arola
Attorney, Agent, or Firm—Young & Thompson

[57] ABSTRACT

A jointing piece for sealingly connecting pipes, said piece having at either end elastic sealing means arranged in their operational position to engage sealingly with the inside of the respective connecting pipe end. In the area adjacent either jointing piece end there is provided a sealing means comprising two outwardly open mutually separated channels running circumferentially side by side and being formed in the jointing piece wall and an elastic sealing ring placed therein. Before the jointing piece end is inserted into the respective pipe end, said ring is placed in the channel nearest the end of the pipe jointing piece, and during insertion the ring is caused, by contact with and relative movement between the jointing piece and pipe, to roll over to and down into the posterior second channel where the ring assumes its operational sealing position.

10 Claims, 2 Drawing Figures

PIPE JOINTING PIECE WITH O-RINGS

The present invention relates to a straight or curved pipe jointing piece for sealing pipe joints and the like, said jointing piece being provided in the area at either end with elastic sealing means arranged to engage sealingly in their operative position with the inside of the respective connecting pipe end.

A number of pipe joints of this general type are previously known. The construction disclosed in the Swedish Pat. No. 360,451 can be mentioned as an example. In this case the sealing means consists of elastic sealing rings having an L-shaped cross section in an unloaded state. These sealing rings are arranged in specially shaped, wide, shallow, circumferential grooves or channels in the jointing piece wall in the areas adjacent the ends of the jointing piece. The sealing rings are kept in place in the grooves (channels) by means of a special clamping clip which holds a cylindrical base portion of the respective sealing rings in place in its groove. This known construction has, inter alia, the drawbacks that the clamping clips are required for anchoring the sealing rings, that the ends of the jointing piece must be provided with relatively exactly shaped grooves or channels which accommodate the base portion and sealing lip of the associated sealing ring in the sealing position, the sealing lip being intended to be pressed into its associated groove in the sealing position.

An object of the present invention is to provide a new type of pipe jointing piece which is substantially simpler to manufacture and shape than the known type, and will allow using grooves or channels made in the simplest possible way for the sealing rings, and wherein these grooves can be formed in the wall of the jointing piece using conventional technology, moreover without needing to be formed with any great accuracy. Added to this is a desire that one should be able to use sealing means (sealing rings) of the simplest possible kind, e.g. conventional rubber O-rings. Neither shall any special means for anchoring the sealing means be required, and personnel without previous experience of such assembly should be able to apply the sealing means in a functionally correct way. It shall also be possible to pull the jointing piece out of the connecting pipe ends without the sealing means thereby being damaged or destroyed, so that these can be re-used on reassembling the jointing piece and connecting pipes.

The said object is achieved according to the invention by a sealing means being arranged in the area adjacent each end of the pipe jointing piece. The sealing means comprises partly two outwardly open grooves or channels running circumferentially side by side and being mutually separated, formed in the wall of the jointing piece, and partly an elastic sealing ring mounted therein which, before the introduction of the jointing piece end into the respective pipe end, is situated in the groove nearest the end of the jointing piece and, during insertion, by contact with and relative movement between the jointing piece and the pipe, is caused to roll over and down into the posterior second channel wherein the sealing ring assumes its operative sealing position.

In order that the sealing rings may quickly be applied to the outer grooves at the ends of the jointing piece without any great accuracy being required, and to obviate the risk of the sealing rings being nipped between the jointing piece and the inside of the respective pipe end in the anterior channels (i.e. those situated nearest the ends of the jointing piece) on inserting the jointing piece into the connecting pipe ends, it is further proposed according to the invention that the width of the anterior channel situated nearest the jointing piece end in either sealing means is greater than the width of the posterior channel.

To facilitate as far as possible the rolling of the sealing rings from their anterior to their posterior channel and to keep the sealing rings in the operative position in their posterior channels, it is further suitable that in cross section the bottom of the anterior channel is substantially flat, while the bottom of the posterior channel has an arcuate shape as seen in cross section.

So that the jointing piece shall be as simple as possible to manufacture, it should be possible to use a pipe having constant outer and inner diameters, or which reason it is also preferable that the portion of the jointing piece lying outside both channels at either end and the portion of the jointing piece lying between the sealing means have substantially the same outside diameter, while the annular portion separating the channels has a somewhat lesser outside diameter than said portions.

By having a somewhat lesser outside diameter for the said annular portion than the rest of the jointing piece (excepting the channels), rolling the sealing rings from the anterior to the posterior channel is facilitated in either sealing means.

The pipe jointing piece is suitably made of metal, while the elastic sealing rings are suitably made of rubber, plastic or the like material. It is, however, also possible to manufacture the jointing piece itself of a suitable plastic.

Figure 2:

The invention will now be further described while referring to two embodiments shown in the attached drawing, in which:

FIG. 1 is a fragmentary cross-sectional view of a first embodiment of the invention; and FIG. 2 is a cross-sectional view of a modified form of O-ring usable in place of that shown in FIG. 1.

Referring now to the drawing in greater detail, it will be recognized that FIG. 1 shows in a partial longitudinal section a jointing piece according to the invention provided with sealing rings, the left hand portion of the figure showing the situation before introducing the jointing piece into the connecting pipe, and the right hand portion of the figure showing the jointing piece after its right hand end has been inserted into a connecting pipe.

The pipe jointing piece according to the invention is generally designated 1 on the drawing. The figure shows the upper portion of an axially sectioned pipe jointing piece. The designation 2 is used for the end portions of two pipes which are to be connected sealingly with each other by means of the pipe jointing piece 1. As may be seen from the figure, the jointing piece is provided at either end with two channels 4 and 5 running around the jointing piece and adjacent each other. Although it is not necessary per se for the function of the invention, it is assumed in the shown embodiment that the two connecting pipes 2 as well as the pipe jointing piece 1 are cylindrical pipes. As shown in the figure, the anterior channels 4 lying nearest the respective jointing piece end have a greater width than the posterior channels 5 have.

The sealing devices at the ends of the pipe jointing piece comprise, apart from the said channels 4 and 5, a sealing means 3 which is a conventional O-ring 3 of rubber in the shown embodiment. The pipe jointing piece is prepared for connecting the pipes 2 in the following manner. Before any part of the jointing piece is inserted in the respective pipe end, a sealing ring 3 is threaded over each end of the jointing piece over the jointing piece portion 6 outside the channels, and is rolled into the anterior channel 4. The sealing ring is then suitably placed in the position shown in the figure, i.e. nearest the outer edge of the channel 4. When the pipe jointing piece is then introduced into the adjacent pipe 2, the inner edge 9 of this pipe will come into contact with the outside of the sealing ring. As the channel 4 has a certain flat width, the now partially compressed (oval) sealing ring will be able to start rolling on the jointing piece towards the channel 5. During the continued insertion of the jointing piece into the pipe 2, the sealing ring 3 rolls up out of the channel 4 and passes over the annular portion 7 between the channels and down into channel 5. The rolling of the sealing ring is facilitated by the annular portion 7 having a somewhat lesser outside diameter than have the portions 6 and 8 of the jointing piece. There is hereby less risk for the sealing ring being pressed destructively against the inside of the pipe 2 and the outside of the portion 7. When the sealing ring has rolled down into the channel 5, it assumes therein its operating position in a way which is apparent from the right hand portion of the figure. In its operational sealing position the sealing ring will naturally have a flattened oval cross section.

By suitable selection of the outside diameter of the pipe jointing piece 1 in relation to the inner diameter of the pipes 2 which are to be connected, and by suitable selection of the cross sectional dimension of the sealing rings 3, it will be possible, by using the jointing piece according to the invention, to achieve between the pipes 2 a joint which is both effective from the point of view of sealing, and stable from the constructional point of view. Thanks to the special design of the sealing means 3,4,5 and 7 at either end of the jointing piece it is possible to dismount the jointing piece from one or both the pipes 2 without damaging or destroying the sealing rings 3. The same sealing rings can hereby be used once again on renewed connection of the pipes 2 by means of the jointing piece 1. Although the sealing rings 3 shown on the drawing are hollow, i.e. they have an annular cross section, there is naturally nothing to prevent sealing rings with solid cross sections being used as long as the sealing rings can be compressed to the extent required for allowing the insertion of the pipe jointing piece into the respective pipe end 2. Such a solid sealing ring is shown at 3' in FIG. 2.

In conclusion it may be mentioned that the invention is naturally not limited to the embodiment shown on the drawing, and the invention is intended to embrace all the possible alternative embodiments and modifications lying within the scope of the following claims.

What we claim is:

1. A thin-walled pipe jointing piece (1), having substantially constant wall thickness, for sealingly connecting pipes (2), said jointing piece being provided at both ends with elastic sealing means (3) arranged in their operational position to engage sealingly with the inside of the respective connecting pipe ends, characterized in that in the area axially inwardly of each jointing piece end there are two outwardly open mutually separated channels (4,5) running circumferentially side by side and being formed in the jointing piece wall as well as an elastic sealing ring (3) which, before inserting the jointing piece end into the respective pipe end, is disposed in the anterior channel (4) nearest the end of the pipe jointing piece and during insertion by contact with and relative movement between the jointing piece (1) and the pipe (2) is caused to roll from the anterior channel (4) over a cylindrical portion (7) situated between the channels and down into the inwardly lying posterior channel (5) in which the ring (3) assumes its operational sealing position, and in that the anterior channel (4) has a greater width than the posterior channel (5) and has a bottom substantially flat, seen in cross section, while the bottom of the posterior channel (5) has an arcuate shape as seen in cross section, and that the portions (6) of the jointing piece lying outside the channels (4,5) at the respective jointing piece ends have substantially the same outside diameter as that of the main part of the jointing piece portion (8) situated between the sealing means at the two ends, while the annular portion (7) separating the channels (4,5) has a lesser diameter than said portions (6,8).

2. A pipe jointing piece according to claim 1, characterized in that the jointing piece (1) is made of metal and that the sealing rings are made of rubber.

3. A pipe jointing piece according to claim 1, characterized in that the rings (3) are solid.

4. A pipe jointing piece according to claim 1, characterized in that said main part of the jointing piece portion (8) is of constant cross-sectional configuration from one said posterior channel (5) to the other said posterior channel (5).

5. A pipe jointing piece according to claim 1, characterized in that said portions (6) of the jointing piece lying outside the channels (4,5) are of uniform cross-sectional configuration from the anterior channels (4) to the end edges of said jointing piece.

6. A pipe joint comprising a pipe jointing piece (1) having substantially constant wall thickness and disposed within and sealingly interconnecting two pipes (2), said jointing piece being provided at both ends with elastic sealing means (3) arranged in their operational position to engage sealingly with the inside of the respective connecting pipe ends, characterized in that said connecting pipe ends are smoothly cylindrical and of uniform cross-sectional configuration, in that in the area axially inwardly of each jointing piece end there are two outwardly open mutually separated channels (4,5) running circumferentially side by side and being formed in the jointing piece wall as well as an elastic sealing ring (3) which, before inserting the jointing piece end into the respective pipe end, is disposed in the anterior channel (4) nearest the end of the pipe jointing piece and during insertion by contact with and relative movement between the jointing piece (1) and the pipe (2) is caused to roll from the anterior channel (4) over a cylindrical portion (7) situated between the channels and down into the inwardly lying posterior channel (5) in which the ring (3) assumes its operational sealing position, and in that the anterior channel (4) has a greater width than the posterior channel (5) and has a bottom substantially flat, seen in cross section, while the bottom of the posterior channel (5) has an arcuate shape as seen in cross section, and that the portions (6) of the jointing piece lying outside the channels (4,5) at the respective jointing piece ends have substantially the same outside diameter as that of the main part of the jointing piece portion (8) situated between the sealing means at the two ends, while the annular portion (7) separating the channels (4,5) has a lesser diameter than said portions (6,8).

7. A pipe jointing piece according to claim 6, characterized in that the jointing piece (1) is made of metal and that the sealing rings are made of rubber.

8. A pipe jointing piece according to claim 6, characterized in that the rings (3) are solid.

9. A pipe jointing piece according to claim 6, characterized in that said main part of the jointing piece portion (8) is of constant cross-sectional configuration from one said posterior channel (5) to the other said posterior channel (5).

10. A pipe jointing piece according to claim 1, characterized in that said portions (6) of the jointing piece lying outside the channels (4,5) are of uniform cross-sectional configuration from the anterior channels (4) to the end edges of said jointing piece.

* * * * *